March 5, 1963 E. G. PERRY ET AL 3,080,545
METHOD AND APPARATUS FOR EFFECTING CORRECTIONS ON RECORDS
Filed Jan. 19, 1959 3 Sheets-Sheet 1

INVENTORS
Edward Gordon Perry
Albert L. Wade
BY Stevens, Davis, Miller & Mosher
ATTORNEYS March 5, 1963

E. G. PERRY ET AL 3,080,545

METHOD AND APPARATUS FOR EFFECTING CORRECTIONS ON RECORDS

Filed Jan. 19, 1959

INVENTORS
Edward Gordon Perry
Albert L. Wade

BY
Stevens, Davis, Miller & Mosher
ATTORNEYS

INVENTORS
Edward Gordon Perry
Albert L. Wade
BY Stevens, Davis, Miller & Mosher
ATTORNEYS

United States Patent Office 3,080,545
Patented Mar. 5, 1963

3,080,545
METHOD AND APPARATUS FOR EFFECTING CORRECTIONS ON RECORDS
Edward Gordon Perry and Albert L. Wade, Dallas, Tex., assignors to Texas Instruments Incorporated, Dallas, Tex., a corporation of Delaware
Filed Jan. 19, 1959, Ser. No. 787,754
10 Claims. (Cl. 340—15.5)

This invention relates generally to a method of and apparatus for changing seismic data into a more usable form, and more particularly to a novel system for applying static and dynamic time delay corrections to magnetically recorded seismic data.

The purpose of any seismic surveying operation is, of course, the discovery of subsurface reflecting layers and the detection of changes in the elevation of such layers. It has been found by those skilled in the art that oil, gas and other minerals are most likely to occur beneath dome-like subsurface formations, as well as where reflecting subsurface layers have shifted on either side of a fault. One commonly used technique in this type of seismic surveying requires the detonation of an explosive charge on the surface of the earth or in a hole drilled in the earth. A spread of seismometers is provided on the surface of the earth at predetermined and known positions in relation to the shot-point. Such a seismometer spread usually includes a number of individual seismometer stations, with an equal spacing between each such station. A seismometer station may consist of one or more seismometers. After detonating the explosive charge, impulses are propagated into the earth and are reflected back to the seismometers from layers where a change in velocity occurs. The reflected impulses are received by the individual seismometers and converted into electrical signals which are then amplified and recorded on a visible or reproducible type record. Such recording equipment is run at a constant speed and it produces uncorrected records of the received impulses in the form of an amplitude versus time curves.

Knowledge of the travel velocity of the impulses in the earth and measurement of the time required for the generated impulses to travel from a shot-point to the reflecting strata and back to the seismometers makes it possible to ascertain the depth of the reflecting strata.

However, records produced as described are not suitable for depth determinations until after certain corrections in the record have been made. Such corrections include the elevation correction, the weathering correction, and normal moveout correction. As is well known to those skilled in the art, the combined correction for elevation and weathering is referred to as the static correction. Conversely, the normal moveout correction is designated as the dynamic correction.

The elevation correction factor is rendered necessary in the seismic record because of the differences occurring in the elevation of the individual seismometer stations in the seismic spread. In order to apply the elevation correction, it is customary to select the elevation of one seismometer station as a reference level and to correct the elevations of the other individual seismometer stations to this reference elevation. The weathering correction is required because of the fact that the surface layer of the earth, known as the weathered layer, is formed of loose, unconsolidated material which has been eroded and/or filled and which has been subjected to the effects of wind, rain, and the elements. The velocity of impulses traveling in such weathered layers is much lower than that found in deeper, more densely packed earth strata. Consequently, unless corrections are made to compensate for this low velocity surface layer, a given reflecting layer may appear to be much deeper than it actually is. The required elevation and weathering corrections are substantially constant along each given trace of a seismic record, although variations from trace to trace across the record are possible. Because of the constant character of the corrections to the record of a single trace produced by a single seismometer station, they will be designated hereinafter in this specification as the static correction.

Normal moveout, the other correction required in a seismic record, results from the fact that the individual seismometer stations in the spread are located at different horizontal distances from the shot-point. Thus, the reflected wave arriving from a particular stratum at the seismometer station closest to the shot-point travels through a shorter distance and, therefore for a shorter time than does the wave arriving from the same stratum at a more remote seismometer station. In order to correct a seismic record for normal moveout, it is necessary to convert all reflected travel times to vertical travel times. This is accomplished by assuming that the reflecting strata are horizontal and by computing moveout times by means of a formula. For instance, one commonly employed formula for this is given as follows:

$$\Delta t = \frac{\sqrt{x^2 + 4z^2} - 2z}{V}$$

where $\Delta t$ = normal moveout time
$x$ = horizontal distance between shot-point and seismometer station
$z$ = depth of reflecting strata
$V$ = average vertical velocity When all of the reflected travel times have been corrected in accordance with such an equation to vertical travel times, and after the static corrections have been made, it is then possible to determine whether the reflecting strata is horizontal or has a dip-angle. The dip-angle is defined as the acuate angle that the interface of strata under consideration makes with a horizontal plane. Since the $z$ distance soon surpasses and greatly exceeds the $x$ distance, it will be readily apparent from the above formula that the $x$ distance becomes increasingly less significant as the $z$ variable increases. Consequently, $\Delta t$ becomes increasingly smaller with record time along each trace. Because of these continuously changing values of normal moveout with time along each trace of the record, the normal moveout correction will be referred to hereinafter in the specification as the dynamic correction.

Static and dynamic time corrections have been made in prior art systems by mathematically computing the corrections on a point-by-point basis as required on each trace in order to bring all the traces into alignment. In the present invention the static correction may be made with relative simplicity through a recording process by altering, in a controlled manner, the length of a recording medium between a recording and a playback head. For purposes of convenience, then, the subject invention will be described with respect to magnetic tapes on which may be recorded individual seismic signals from individual seismometer stations i.e., single trace seismograms. Since the tape is driven at a constant speed, this mode of operation permits the recording head for each seismometer trace to be displaced physically along the recording medium in order to introduce the time delay required for static corrections. Moreover, the present invention has been perfected to assist in eliminating the tedious and time-consuming computations previously necessary to correct a seismic record both statically and dynamically, and to teach a novel means for applying the dynamic correction to the seismic data.

According to the present invention, it is assumed that the ratio between the normal moveout corrections for any two given traces with different offset distances bears a constant relation for corresponding record times regardless of the velocity function. It has been found that this assumption results in negligible errors at times corresponding to depths of interest. By "depths of interest" is meant depths of 1000 feet or greater.

Therefore, one primary object of the present invention is to provide a method of and apparatus for applying static and dynamic corrections to recorded seismic data.

Another object of the present invention is to teach a novel system for effecting the required static and dynamic corrections on magnetically recorded seismic data automatically.

Still another object of the present invention is to provide a novel system for effecting a fixed or static correction for the seismic data by displacing the recording head of a magnetic recorder, and for effecting a dynamic correction for seismic data by changing the effective tape separation between the recording head and the playback head.

A further object of the present invention is to disclose a novel system controlled by a function generator for making the dynamic correction during the playback of the recorded data by continuously changing the effective tape separation between the recording head and the reproducing head.

A still further object of the present invention is to provide a novel proportioning mechanism for controlling the dynamic correction in order to permit a particular function generator to be applicable to more than a single trace.

These and other objects of the present invention will become apparent by reference to the following detailed description and drawings, in which like numerals indicate like parts and in which.

The apparatus of the present invention is employed to effect corrections as previously described. In order to afford a full and complete understanding of the nature of the apparatus of the present invention, as well as its function and manner of use, the following example of its use should be considered. It is to be noted that the use to be described is given by way of example only, and is not to be construed as placing any limitation or restriction upon the way in which the apparatus of the present invention can be employed to effect the necessary corrections.

The results of a seismic survey are often reproducibly recorded on a multitrace record in uncorrected form. For instance, the use of a magnetic record is common for this purpose. The multiple traces recorded on the primary recorder can then be individually and sequentially fed to the correcting device of the present invention wherein the necessary corrections are effected, the signals, thereafter, can be recorded upon a second reproducible multitrace record which may also be of the magnetic variety. The re-recorded signals will then be in a corrected relationship by virtue of passing through the apparatus of the present invention and having the requisite corrections imparted to them.

It will be appreciated that there are many variations upon the theme of the present invention. For instance, it is not necessary that the apparatus receive seismic signals from a reproducible record for, in fact, the apparatus is susceptible of receiving seismic signals "live," that is, directly from the geophones during a pending seismic survey. If such be the case, however, it would be necessary to provide a unit of the apparatus of the present invention for each seismic signal in order that the necessary corrections can be effected all at once or alternately, to include means to arrange the signals in sequential form so that they can be fed serially through a unit of the apparatus of the present invention.

It will also be noted that some means must be employed to preserve the relationships which basically exist between the various traces or seismic signals. One convenient way to accomplish this is to use the time break signal as an indexing point in time whereby the basic relationships can readily and easily be preserved.

There now follows a complete and detailed description of the apparatus of the present invention from which it will more clearly appear how the corrections are effected on the various seismic signals being handled while they are being transferred from their uncorrected state to their corrected state.

Figure 1:
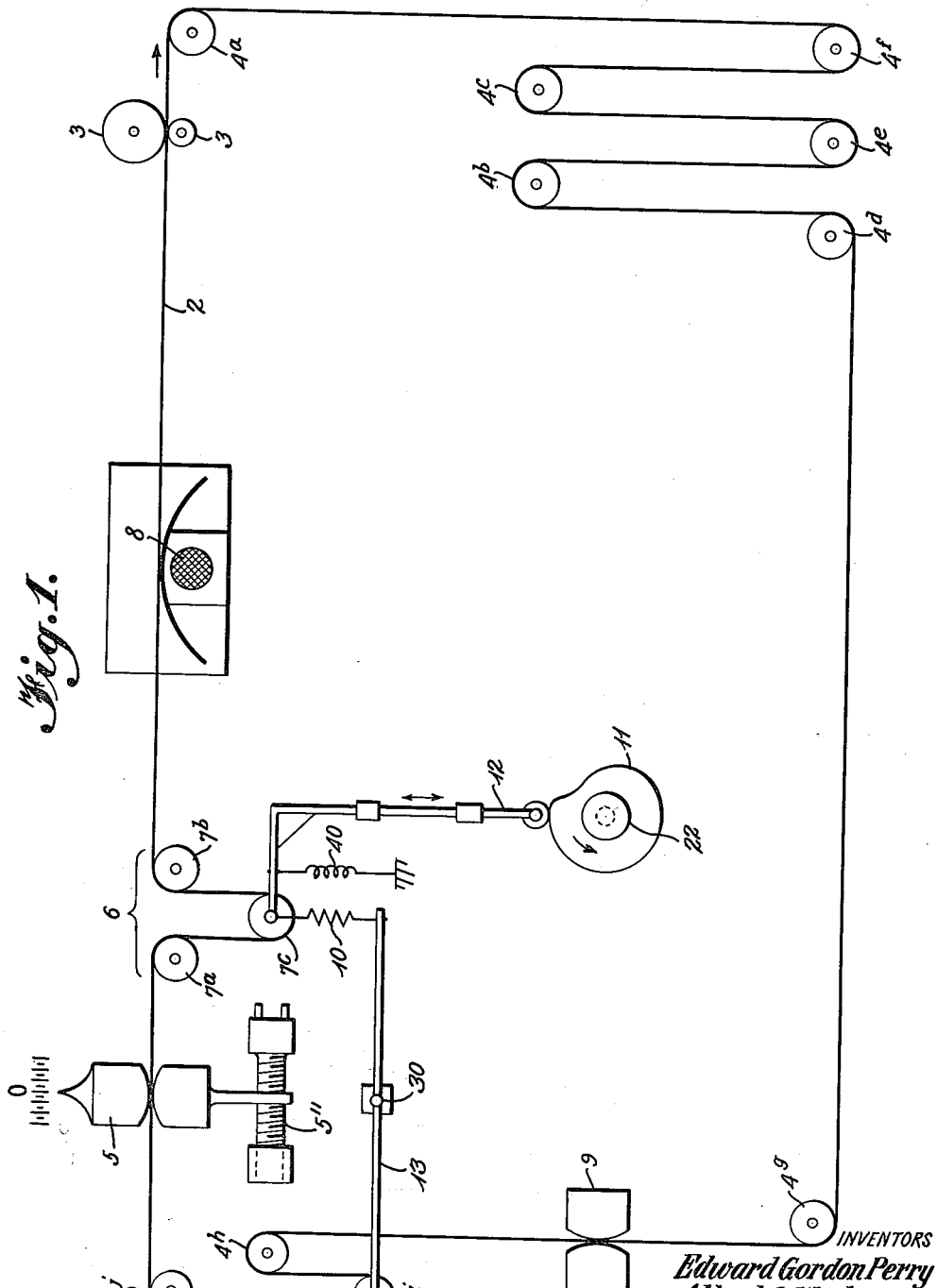
FIG. 1 illustrates diagrammatically the structure and co-relationship of the various elements of the invention.

In FIG. 1, traction is applied to a continuous loop of magnetic tape 2 by means of tape drive discs 3. The tape 2 may comprise a conventional ¼ inch width recording tape, characterized by the ability to receive a controlled degree of magnetization along its length. Tape 2 is caused to move at a suitable constant linear velocity. By means of the tape drive discs 3, the tape 2 is caused to engage and roll over the periphery of the various pulleys 4a, 4b, 4c, 4d, 4e and 4f, shown in the right hand portion of the drawing.

In the left hand portion of the drawing, the tape 2 reaches a recording head 5 after engaging and rolling over the periphery of the pulley 4g, 4h, 4i and 4j. The recording head 5 is provided with a suitable screw means 5" for adjusting the head along the tape 2 to either side of the indicated "zero" reference point. By adjustment in this manner of the position of the recording head static corrections may be made to the seismic trace. This adjustment may be made using automatic or semi-automatic means such as an electrical servo-system or a mechanical tab system.

Beyond the recording head 5, the tape 2 traverses the dynamic correction idler loop indicated generally by the numeral 6, and comprising the pulleys 7a, 7b, and 7c. The tape completes the circuit between the idler loop 6 and the tape drive discs 3 by passing over and engaging the surface of the playback unit 8. The unit 8 may comprise a conventional flux sensitive playback head which provides a signal indicative of the instantaneous degree of magnetization encountered in the moving tape 2.

In order to remove the signal impressed upon the tape, an erasing head 9 is provided in the path of the tape 2 before the recording head 5. A plate cam 11 is provided to control the vertical position of pulley 7c in order to determine the size of the dynamic correction idler loop 6. The profile of the cam 11 varies as a function of the computed variation of normal moveout with respect to time for the known offset distance of the particular seismometer station represented by the trace then being corrected. The normal moveout is, of course, influenced by the velocity function of seismic signals in the particular area of survey. Thus, a different cam is required whenever the area of seismic survey exhibits a velocity function different from that for which cam 11 was cut. A follower linkage, identified diagrammatically by the reference numeral 12, is actuated as the cam 11 is caused to rotate. Spring 40 is attached between the follower linkage 12 and a base connection to bias the follower linkage 12 normally into engagement with cam 11. In this manner, the vertical position of pulley 7c is controlled. A second spring 10 is connected between pulley 7c and one end of a bar 13 that is pivotally mounted at 30. The other end of bar 13 is attached to pulley 4i. The purpose of spring 10 is to maintain constant tension in the tape 2 by transmitting the motion of pulley 7c to pulley 4i through the bar 13. The cam 11 in FIG. 1 is shown in its zero or starting position. As cam 11 rotates in the direction of the arrow, the right hand side of bar 13 drops downwardly and the pulley 4i moves upwardly in response to the bias of spring 10 to maintain the tape 2 under a constant tension.

In operation, the static correction is effected by shifting the recording head 5 a fixed distance either in the same direction as the movement of the tape 2 or in the opposite direction. The screw means 5'' is used to effect this shift of the recording head 5. The fixed distance which the recording head 5 is moved will produce a known delay time between the recording of the signal by head 5 and the playback of the signal by head 8 since the tape 2 is fed forward over the playback unit 8 at a constant speed. The amount of delay time required may be computed from the knowledge of the shot-point elevation and the weathering characteristics of the strata.

At the instant of commencing the recording operation, the system simultaneously initiates the rotation of the cam 11. As stated above, the profile of the cam 11 comprises a precision contour which changes in accordance with the variations encountered in the normal moveout with respect to time for preselected offset distance for one seismometer. As cam 11 rotates, the spring 40 maintains the follower linkage 12 in contact with the cam 11 and draws pulley 7c downwardly. In this manner, the effective tape separation between the recording head 5 and the playback head 8 is varied to effect a dynamic correction proportional to the desired normal moveout correction.

The necessary synchronization between the cam rotation and the primary magnetic recorder may be achieved by employing a signal from the primary recorder to energize a magnetic clutch (not shown) interconnecting cam 11 and the drive means 22. However, it will be appreciated that the use of other conventional types of synchronizing schemes is deemed to fall equally well within the purview of this invention.

Figure 3:
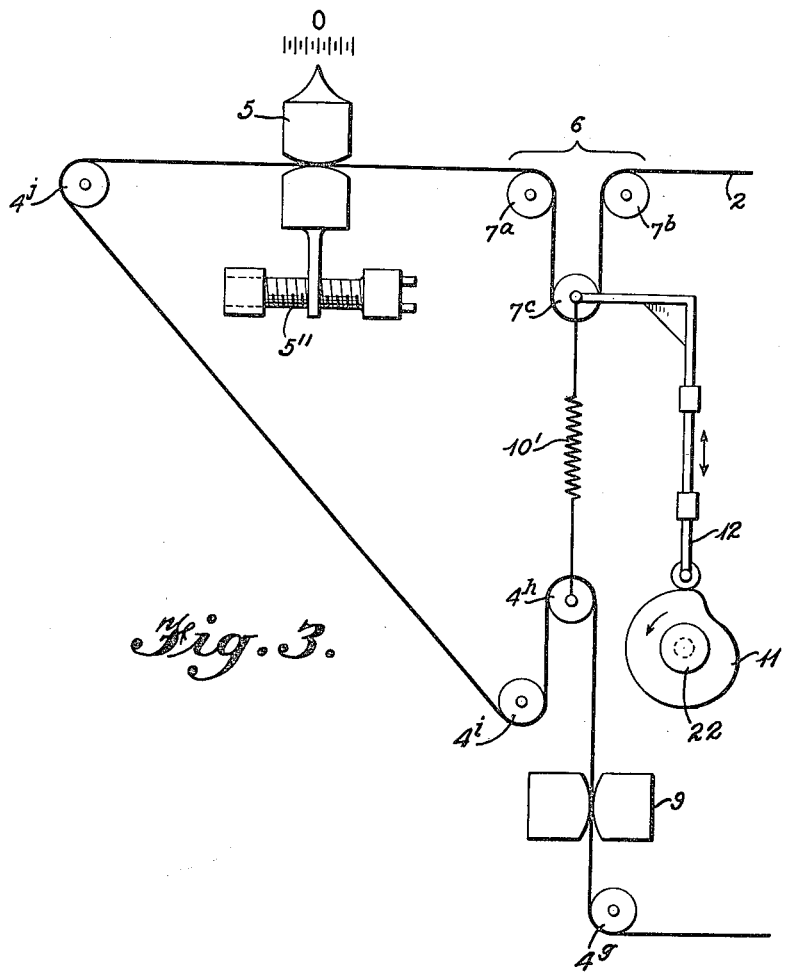
FIG. 3 is a fragment of the diagram shown in FIG. 1 disclosing a variation.

A variation of the constant tape tension arrangement of FIG. 1 is shown in FIG. 3. In place of the rocking movement of pulleys 4i and 7c about the fixed pivot 30, there is provided a linear arrangement. Pulley 4h is aligned with pulley 7c and is connected with the end of spring 10' and is free to move up and down. Pulley 4i is a fixed or stationary pulley. The remainder of the assembly is the same and accordingly the same reference numerals have been used in designating identical parts.

Figure 2:
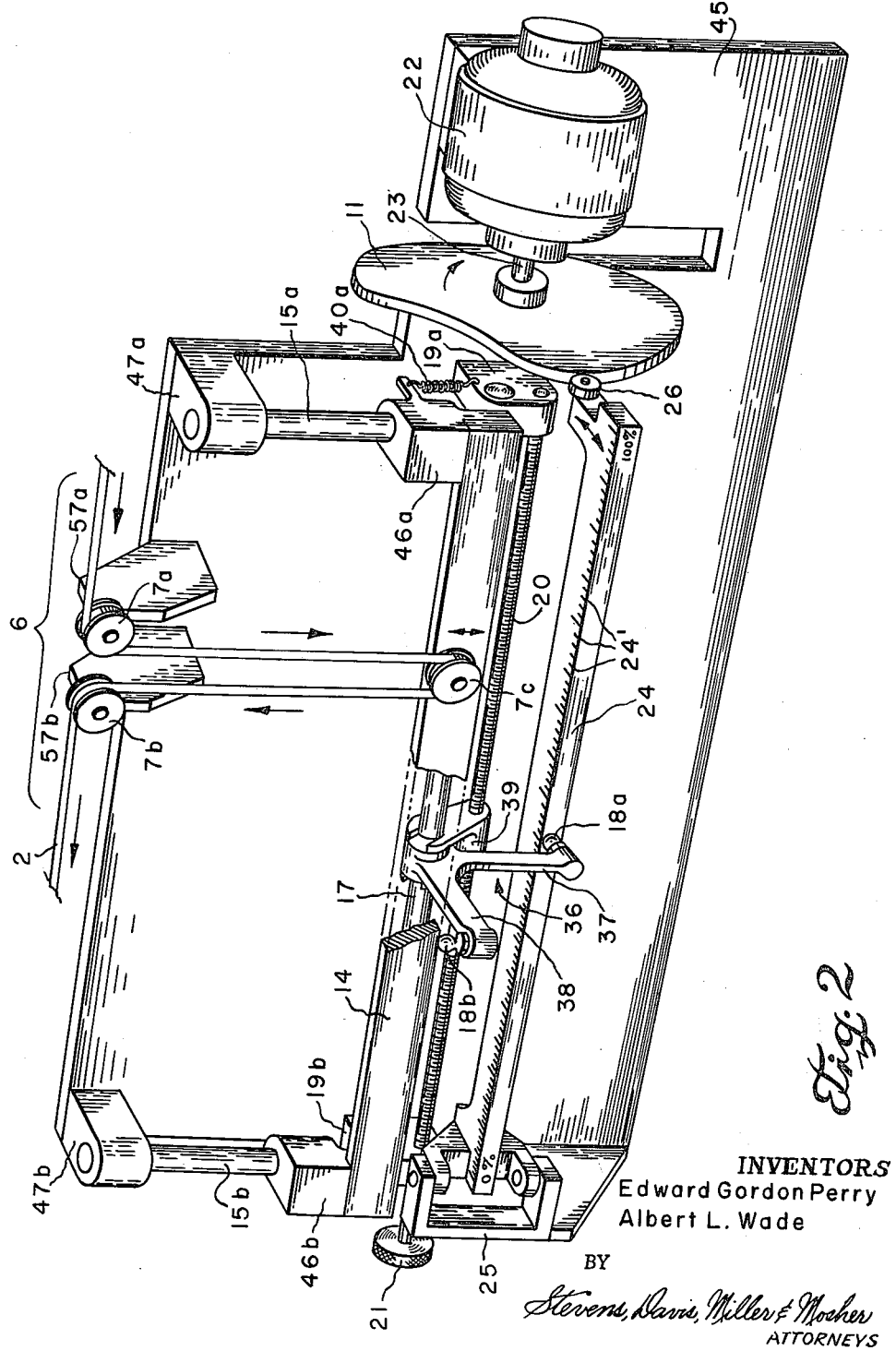
FIG. 2 shows a detailed view of a proportioning mechanism which may be used in the practice of the present invention.

Turning now to FIG. 2, the structure and arrangement of a novel proportioning mechanism will now be described. By eliminating the necessity for precisely machining a different plate cam for each seismometer spacing, the proportioning mechanism of FIG. 2 performs an invaluable service. The mechanism illustrated makes available any desired fraction of the total possible vertical pulley displacement associated with the spacing between a preselected seismometer and the shot-point. The greatest amount of correction is required for the seismometer that is farthest away from the shot-point, that is, for the seismometer whose offset distance is the greatest. In the embodiment shown in FIG. 2, a fraction of the total cam displacement is used to actuate the pulley 7c and, thus, apply dynamic corrections to seismic traces produced by seismometers whose offset distances are less than the offset distance between the shot-point and the most remote seismometer in the spread.

The proportioning mechanism of FIG. 2 is described in terms of a cam 11 cut to produce the correction for a seismometer farthest away from the shot-point. Consequently, some fraction of the correction supplied by cam 11 is used for all seismometer offset distances less than the maximum. However, it is within the scope of this invention to cut the cam 11 for a seismometer offset distance that is less than the maximum seismometer offset distance in the spread and to use the mechanism as a multiplier to obtain corrections for seismometer offset distances greater than the distance for which the cam is cut.

In FIG. 2 the dynamic correction idler pulley loop is again indicated generally by the numeral 6. Upper pulleys 7a and 7b are shown mounted for fixed rotation in a vertical plane on mounting members 57a and 57b which extend laterally from vertical support member 45.

The pulley 7c is rotatably journaled upon the idler pulley bar 14 which is integral with movable guide blocks 46a and 46b. These blocks together with bar 14 reciprocate in a vertical direction in engagement with guide rods 15a and 15b fixedly supported in brackets 47a and 47b, respectively. A tension spring 40a attached between movable guide block 46a and a bracket 19a and another spring (not shown) between movable guide block 46b and fixed bracket 19b are connected to bias pulley bar 14, resiliently in a downwardly direction. Directly below the pulley bar 14 there is provided a rocker arm, indicated generally at 36, comprising arms 37 and 38 provided with spherical riders 18a and 18b, respectively.

The rocker arm 36 is slidably disposed on a rod 17, which is maintained parallel to the bar 14 by fixed brackets 19a and 19b. Rod 17 and bar 14 are fixed in planes mutually parallel to the plane of cam follower bar 24. The relative position of rocker arm 36 on rod 17 is controlled by means of a threaded rod 20 which is rotated by means of a knob 21 mounted upon fixed bracket 19b. The adjustment of the position of rocker arm 36 on rod 17 may be accomplished utilizing automatic or semi-automatic means such as an electrical servo-system or a mechanical tab system. A forked guide 39 threadedly engages rod 20 and is moved thereby. The forked portions of guide 39 engage rocker arm 36 and carry the rocker arm 36 to its selected position along cam follower bar 24.

To the right of FIG. 2 is shown the plate cam 11, with its associated drive means 22 fixedly mounted on vertical support member 45. Power from drive means 22 is supplied to cam 11 by means of shaft 23. The drive means 22 may include an electric motor, such as a hysteresis synchronous motor with suitable gear reduction provided or other suitable supply of torque, combined with the magnetic clutch earlier mentioned in connection with the explanation of the need for synchronizing the system.

Cam follower bar 24 is pivotally mounted at its end remote from cam 11 by means of a bracket member 25. The opposite end of the bar 24 is provided with a roller follower 26 which engages the precisely formed contour of plate cam 11 and is deflected thereby. The cam follower bar 24 is provided with a plurality of linearly spaced graduations 24' along its length to permit actuation of the pulley 7c in any desired fraction of the maximum vertical displacement.

The lower spherical rider 18a engages the face of cam follower bar 24 and is deflected thereby. Accordingly, the upper spherical rider 18b by virtue of its engagement with the pulley bar 14, acts to allow the bar 14 to move in accordance with the direction of a resilient bias, and thereby alters the effective tape separation between the recording and playback heads.

In the operation of the proportioning mechanism above described, the tension spring 40a and a similar spring connected between movable guide block 46b and fixed bracket 19b cause pulley bar 14 to bear upon the spherical rider 18b. This force is transmitted, via rider 18b, arm 38, arm 37 and rider 18a, to the face of the graduated follower bar 24. As a result, the roller 26 is caused to engage and roll upon precisely-shaped contour of the plate cam 11. Thus, as cam 11 rotates, an oscillatory motion is imparted to the bar 24. The construction is such that with spherical rider 18a positioned directly across bar 24 from roller 26, at the point marked 100%, the full change in contour of cam 11 is available for actuating pulley 7c. However, as the rocker arm 36 is positioned along the face of bar 24 in a direction from the cam 11 toward the bracket 25, proportionally smaller deflections are obtainable. In other words, as the rocker arm 36 is adjusted by means of the position of forked guide 39 along the rod 17, the movement transmitted to the pulley 7c as a result of changes in cam contour become less and less, until it becomes zero at the pivot point of the bar 24. A percentage of the total available deflection from the cam 11 is obtained for any given position of the rocker arm 36. This percentage is the amount indicated by the scale lines 24' on the bar 24 adjacent spherical rider 18a.

As was stated previously, regardless of the velocity function, it is assumed that the ratio between the normal moveout corrections for any two given traces with different offsets bears a constant relation for corresponding record times. It has been found that this assumption results in negligible errors at times corresponding to depths of interest. By synchronizing the start of the cam 11 with the start of the record trace and by rotating cam 11 at a constant angular velocity for all traces within a record, corresponding record times are achieved between the individual trace being corrected and the trace for which the cam was cut.

The manner of choosing the proper ratio or percentage of normal moveout correction of the trace for which the cam 11 has been cut, to be applied to the individual trace being corrected, will now be described. The normal moveout correction time at varying depths for a finite number of points, preferably in excess of six points distributed through depths of interest, is computed for the seismic trace under consideration. The proper ratio to be applied to the proportioning mechanism is then obtained by computing the summation of the normal moveout corrections for the trace under consideration and dividing this sum by the summation of the normal moveout corrections for corresponding depths in the trace for which the cam 11 was cut. This yields a percentage figure to which the proportioning mechanism described above is set. In this manner, a single plate cam contour can be efficiently employed to apply the dynamic correction to seismic data received by a plurality of individual seismometer units spaced at varying distances from the shot point. If desired, scale 24' may be calibrated in feet.

The correction provided by the cam 11 is supplied only during approximately the first 180 degrees of rotation of the cam. During the second 180 degrees of rotation, the cam is restored to its starting position. The entire loop of tape 2 is sufficiently large so that the time required for cam 11 to make 360 degrees of rotation is slightly less than the time required for a complete rotation of tape 2. This insures that the cam 11 will be in its proper starting position when it is desired to make the correction for the next trace. Also it is possible to position the splice in the tape, which is required in a continuous loop of tape, it be included in the second 180 degrees of rotation.

Two things occur during the second 180 degrees of rotation of cam 11. First, the cam rotates back to its starting position and restores the pulley 7c to its maximum upward position. Second, an operator adjusts the position of the rocker arm 16 of the proportioning mechanism to allow for a different offset distance for the next trace to be corrected. It is customary in seismic exploration to impose a signal upon the raw data recording. This signal is commonly known as the time break and is a signal which occurs at the same time the energy source is actuated. This signal may then be used to trigger or start the rotation of cam 11 with the beginning or start of the seismic trace. Thus, it is possible to synchronize the start of the uncorrected seismic trace with the beginning of rotation of cam 11. It will be apparent that the means used to control the position of forked guide member 39 may be varied. For example, the rod 29 may be an unthreaded member and a spring may be used to urge the forked guide member 39 towards a set of automatically operated stops, similar to the use of tabulator stops on a typewriter, for automatically obtaining a percentage of the total offset.

This invention is not limited to the use of a cam as a function generator since it is possible to employ other suitable means to generate the particular dynamic correction function. For example, the required information, such as the spacing of the seismometer stations, initial velocities, acceleration constants, and vertical travel time may be provided as inputs to a computer which will then generate the required dynamic correction function.

The present invention has been described with respect to a temporary storage system, that is, one in which the recorded seismic trace was played back substantially simultaneously with the recording. However, since the corrections have been made on the tape in the manner of the recording, it is possible to use this invention as a permanent magnetic storage system. In other words, the playback could be at any future date so long as the start of the tape was synchronized with the start of the tapes for other seismic traces.

In conclusion, it will be evident that we have disclosed our novel method and apparatus in full, clear and concise terms as required by the statute. However, it will be equally evident that various modifications, substitutions and alterations may be made therein without departing in any manner from the spirit and scope of the appended claims.

What is claimed is:

1. In a device for effecting both static and dynamic corrections in recorded seismic data, a continuous flexible loop of magnetically permeable material, a plurality of pulleys, tractive means connected to pull said flexible loop over said pulleys, reproducing means mounted in reproducing relationship with said loop, recording means mounted in recording relationship with said flexible loop, means to vary the linear distance between said reproducing means and said recording means to effect the static correction in said seismic data, and means for imparting motion to at least one of said pulleys to effect a dynamic correction in said recorded seismic data.

2. The device as claimed in claim 1, wherein said means for imparting motion to at least one of said pulleys includes cam means.

3. The device as claimed in claim 1, where said means for imparting motion to at least one of said pulleys includes a computer.

4. In a device for effecting both static and dynamic corrections in recorded seismic data, a recording head, a loop of flux sensitive material disposed adjacent to said recording head to receive signals therefrom, a playback head mounted adjacent to said loop so as to redevelop signals therefrom, means mounted to shift the position of one of said recording heads relative to playback head to apply a static correction to said seismic data, at least one spring loaded pulley mounted between said recording head and said playback head to engage said loop, and means for imparting motion to said pulley to apply said dynamic corrections to said data.

5. In a device for effecting both static and dynamic corrections in recorded seismic data, magnetically permeable flexible means, recording means mounted in recording relationship with said flexible means to impress said seismic data thereon, reproducing means mounted in spaced relationship to said recording means in reproducing relationship with said flexible means to develop signals responsive to the seismic data impressed thereon, screw means mounted to threadedly engage said recording means to impart rectilinear motion thereto to effect said static corrections in said data, and means mounted to vary the instantaneous length of said flexible means measured between said recording means and said reproducing means in accordance with a predetermined function of elapsed time.

6. In a proportioning mechanism for applying dynamic correction to seismic data, a plate cam provided with a precision contour formed in accordance with the desired dynamic correction, drive means connected to supply torque to said plate cam, a pivotally mounted follower bar mounted to deflect in response to rotation of said plate cam, support means slidably mounted for vertical displacement, a pulley rotatably mounted upon said support means, means for resiliently biasing said support means in a first direction, and means mounted to engage said follower bar and said support means and urge said support means oppositely to said first direction in response to said deflections of said follower bar.

7. In a proportioning mechanism for applying dynamic correction to seismic data, cam means provided with a precision contour, drive means mounted to rotate said cam means, follower means pivotally mounted to engage said cam means and oscillate responsive thereto, movably mounted support means, pulley means mounted upon said support means, tensile biasing means mounted to urge said support means in a first direction, and movable means disposed to contact both said follower means and said support means to transmit force therebetween to deflect said support means in a direction opposite to said first direction.

8. In a proportioning mechanism for applying dynamic correction to seismic data, a plate cam, drive means connected to said cam to supply torque thereto, a follower bar mounted to engage the periphery of said plate cam, a pair of guide posts, a support member slidably disposed with respect to said guide posts, spring means mounted to resiliently bias said support member in a first direction, a rod mounted parallel to said support member, a rocker arm slidably mounted upon said rod and disposed to engage and transmit force between said follower bar and said support member to deflect the latter oppositely to said first direction, and means including a graduated dial mounted to threadedly engage said rocker arm to control the position of said rocker arm upon said rod, whereby any specified fraction of the deflection with time of the follower bar may be applied to actuate said support member.

9. In a device for effecting both static and dynamic corrections in recorded seismic data, a continuous flexible loop of magnetically permeable material, a plurality of pulleys, tractive means connected to pull said flexible loop over said pulleys, reproducing means mounted in reproducing relationship with said loop, recording means mounted in recording relationship with said flexible loop, and means for imparting motion to a least one of said pulleys to effect both static and dynamic corrections in said recorded seismic data.

10. The device for effecting both static and dynamic corrections in recorded seismic data, as defined in claim 9 in which said means for imparting motion to at least one of said pulleys comprises a computer.

References Cited in the file of this patent
UNITED STATES PATENTS

| | | |
|---|---|---|
| 1,652,299 | Carpenter | Dec. 13, 1927 |
| 2,800,639 | Lee | July 23, 1957 |
| 2,886,795 | Thatcher | May 12, 1959 |
| 2,887,890 | Schardt | May 26, 1959 |
| 2,940,536 | Bazzoni | Dec. 13, 1927 |